Feb. 21, 1961 R. GOLDSMITH 2,972,549
PROCESS OF MAKING PLASTIC IMPREGNATED SLEEVING
Filed Sept. 3, 1957
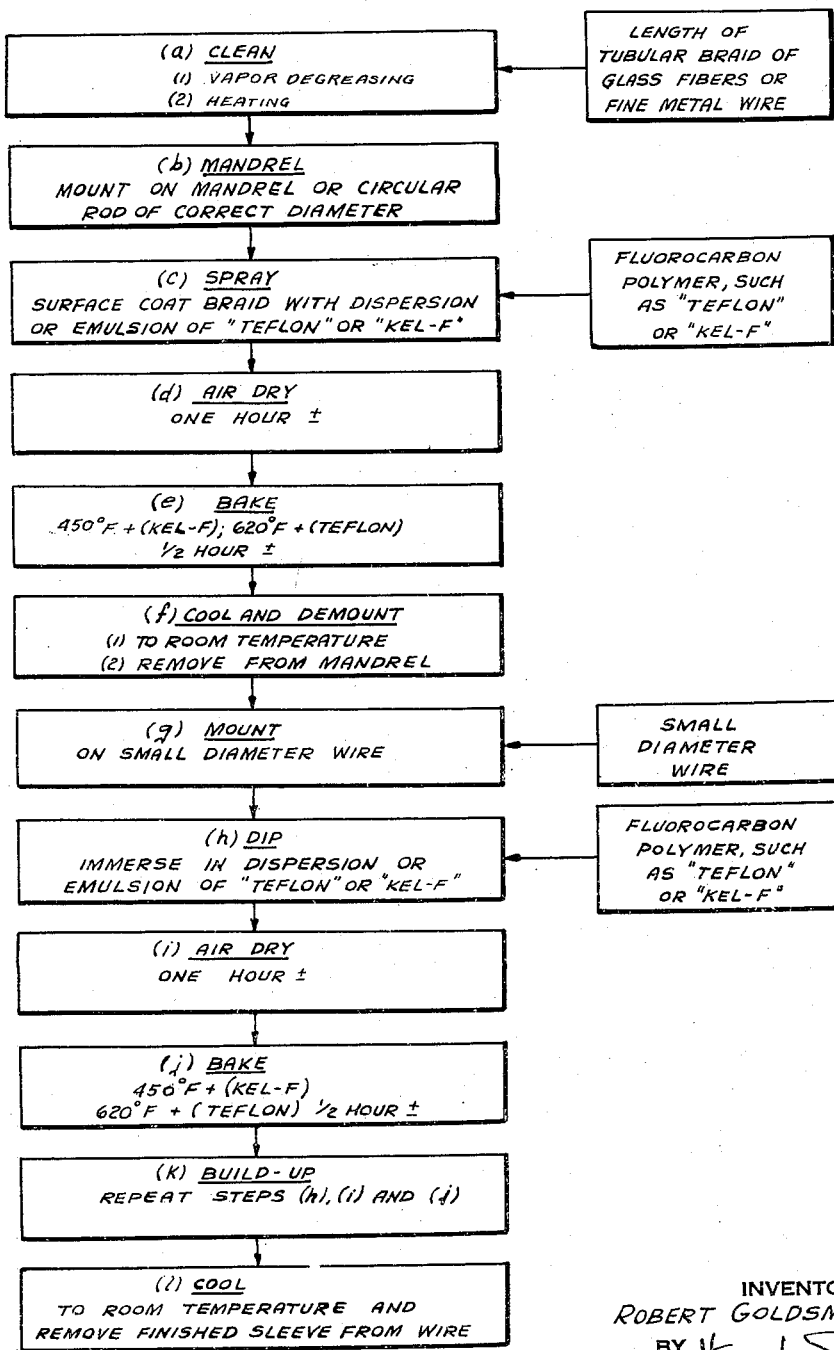
INVENTOR
ROBERT GOLDSMITH
BY
ATTORNEY

United States Patent Office

2,972,549
Patented Feb. 21, 1961

---

2,972,549

PROCESS OF MAKING PLASTIC IMPREGNATED SLEEVING

Robert Goldsmith, Great Notch, N.J., assignor to General Plastics Corporation, Paterson, N.J., a corporation of New Jersey Filed Sept. 3, 1957, Ser. No. 681,539

9 Claims. (Cl. 117—4)

My invention relates to a process of making plastic impregnated sleeving for use as bearing bushings, identification sleeves, and the like.

The fluorocarbon polymers are extremely resistant to oxidizing agents and are not attacked by nitric acid, concentrated and fuming sulfuric acid, nitrating mixture, acid chromate or permanganate at ordinary temperatures. They are extremely stable to air and do not burn. They are inert to halogen and alkalies. For these reasons they may be used for sleeving to serve as permanent identification for wires or cables exposed to high temperatures. Polymerized trifluorochloroethylene (one brand of which is sold as "Kel-F" by The M. W. Kellogg Company) is not a satisfactory insulating sleeving in many instances since it deteriorates in the presence of copper. If such cables are insulated with sleeves of fluorocarbon polymer such as polymerized tetrafluoroethylene (one brand of which is sold as "Teflon" by E. I. du Pont de Nemours and Company), they cannot be printed with identification markings owing to the fact that this solid fluorocarbon has the unique physical property that nothing adheres to it. This property, in turn, permits it to act as a permanent lubricant as will be pointed out more fully hereinafter.

If, however, a sleeve is first braided of fiber glass or fine wire such sleeve can be impregnated with a fluorocarbon such as Kel-F and the sleeve will be printable. Teflon could also be used but requires subsequent treatment or etching to render it printable. The sleeving then can be employed advantageously for high temperature cable identification.

The unique property of Teflon, and to a lesser extent, Kel-F, of presenting a low coefficient of friction enables it to act as a lubricant. Teflon, for example, sliding upon Teflon has a coefficient of friction of from .04 to .05. Steel sliding upon Teflon has a coefficient of friction of from .09 to .14. Teflon sliding on steel, however, has the remarkably low coefficient of friction of .004. This suggests that a journal rotating in a bearing may be supplied with a Teflon bushing. The problem, however, cannot be this simply solved owing to the fact that Teflon is subject to cold flow. Thus a bearing which might be accurate in its dimensions as installed will with the application of pressure yield and so become permanently deformed. Besides this, it is difficult to extrude a Teflon tube having a thin section, and bushings of solid Teflon must be comparatively thick walled. I have solved the problems by impregnating braided sleeving made of glass fibers or sleeving made of fine wire braid with a fluorocarbon such as Teflon. The impregnated braiding forms a tube which holds its dimensions with great stability owing to the incompressibility of glass or of metal. The strength of the glass fiber, braided tubing, furthermore, is such that the tubing may be made much thinner and still have requisite dimensional stability.

The Teflon impregnated glass fiber tubing may then be sawed into short lengths and thus form bushings of correct dimensions adapted to be slipped over shaft journals for coaction with bearings which need not then be oiled. Such assemblies are particularly useful in applications where the bearings are difficult to reach with oil or in such devices or scientific instruments as calculators, adding machines, and the like. Such bearings, furthermore, can be employed from temperatures between below −70° F. to approximately +470° F. owing to the fact that Teflon will exist in the solid phase until a temperature of 620° F. is reached.

The concept of sleeving impregnated with fluorocarbon polymer is new as far as I am aware, but the carrying out of this concept and the fabrication of the sleeving proved to be a difficult matter. The sleeving has to be uniformly impregnated, that is, inside and throughout, with a dimensionally accurate layer of Teflon or Kel-F.

As a practical matter, Teflon is the better material to use for journal bushings, while Kel-F can be used for identification sleeving.

In general, my invention contemplates the mounting of a length of fiber glass, tubular braid upon a mandrel or circular rod having the correct internal diameter for the finished sleeving. While thus mounted the surface of the braid is sprayed with a dispersion or emulsion of the fluorocarbon polymer. The braid thus treated is permitted to air-dry and then it is baked at above the fusion temperature of the polymer. The plastic coated braid is then permitted to cool after which it is removed from the mandrel. It is now a tube of the correct dimension and of sufficient rigidity to be handled. It is then mounted in such a manner that it can be dipped in a dispersion or emulsion of fluorocarbon polymer. The mounting is such that the dispersion will flow into the inside of the tube and coat the inner surface as well as the exterior surface of the tube. For this purpose I employ a small diameter of wire which will enable the tube to be swished around in the dispersion or emulsion of the fluorocarbon polymer. Tube is then air-dried and baked at a temperature above the fusion point of the fluorocarbon polymer. This fuses a thin layer of plastic both on the inside and outside of the tube. The process is repeated until a laminated coating of the fluorocarbon polymer is formed. The sleeving is then ready for printing if it is to be used as identification sleeving. If journal bushings are to be made, the sleeving is sawed up into lengths corresponding to the width of the bearings with which the journal bushings are to be employed.

The accompanying drawing which forms part of the instant specification is the diagrammatic flow sheet showing the steps employed in carrying out my process.

More particularly, I take a length of tubular braid formed of glass fibers or fine metal fibers. Preferably, I employ glass fibers in the fabrication of the braiding since they have great tensile strength, great resistance to heat, and great resistance to deformation in response to pressure. If wire is used for the making of the tubular braid, it may be of steel, copper, silver, aluminum, or the like.

Any convenient length of tubular braiding may be employed. In carrying out my process, I treat a plurality of lengths of braiding simultaneously. A convenient length is in the vicinity of four feet. For purposes of ease in explanation, however, I will describe my process as if I were treating a single length of braiding.

The braided sleeve must be clean. As a first step in cleaning I subject the tubular braid to degreasing for a period using trichloroethylene vapors or the like. The cleaning solvent is boiled and the vapors allowed to condense on the braid, drip off and be revaporized. This degreasing removes the sizing and other dirt from the sleeve. Following this degreasing I heat the braided sleeve at a temperature in the vicinity of 625° F. for a period sufficiently long to remove volatiles remaining after degreasing. This heating may take as long as two or three days.

It is understood, of course, that if the braid is initially sufficiently clean it need not be subjected to further cleaning. As a general rule, however, I prefer to clean the braided sleeve.

The braided sleeve is then mounted on a mandrel of the correct diameter. It is understood, of course, that a tubular braiding of different sizes will be employed for mounting on different mandrels. I insure that it is mounted without wrinkles or bulges. The sleeve size, furthermore, must be such that it is not mounted on the mandrel with excessive tightness. If desired, I may coat the mandrel with Teflon in order to make it easier to demount the braided sleeve after it has been preliminarily coated with plastic. In practice I have used mandrels of diameters varying between $1/16$ inch to 1 inch. The mandrels which I have employed are steel rods polished, cleaned, and coated with a layer of Teflon.

I then form a dispersion of the fluorocarbon which I employ to spray the braid while mounted on the mandrel in order to surface-coat it. I have found that for this phase of the process approximately four pounds per gallon of the fluorocarbon polymer should be employed. It is understood, of course, that any appropriate concentration of the fluorocarbon polymer may be used. In general, a heavy concentration will produce a thicker coating while a lighter concentration will produce a thinner coating. The thickness of the coating with four pounds per gallon varies between .5 and 1.5 mils depending on atmospheric conditions and temperature. After the mandrel mounted, braided sleeve has been sprayed with a fluorocarbon, either Teflon or Kel-F, it is allowed to air-dry for about an hour. It is then placed in an oven and maintained at the fusing temperature of the plastic for approximately one-half hour. When Teflon is used the temperature will be in excess of 620° F. When Kel-F is used the temperature will be in excess of approximately 450° F. This first coat of the plastic enables me to fix the diameter of the sleeve. It will be understood, of course, that the sleeve is somewhat larger in internal diameter and somewhat smaller in its external diameter than the finished dimensions owing to the fact that additional layers or coats of the plastic will be applied. I make allowance for this, however, in determining the mandrel size.

The plastic coated, braided sleeve is then allowed to cool to room temperature after which it is demounted from the mandrel.

The length of sleeve is then mounted on a small diameter of wire and after this, it is dipped in a dispersion of the fluorocarbon polymer, usually with agitation, to insure that the dispersion will flow into the interior of the braided tube. The percentage of solids in this dispersion is about one-half of that used for the preliminary coat. Generally, a solids content of about two pounds per gallon may be advantageously employed during this step of the process. After the solids content has been determined, it can be controlled readily by maintaining the viscosity of the dispersion. The tank in which the dipping is performed is preferably vertical to insure the ready escape of air from the interior of the tube. The dispersed polymer is kept in constant suspension by means of a recirculating pump. It is important that the dispersion be maintained in a uniform condition and uniform viscosity. Lack of uniformity in the dispersion produces irregular results.

The dipped tube is then removed from the dipping tank and air-dried for about an hour. This preliminary step is performed to permit baking. Again, the dipped, braided sleeve is baked at a temperature in excess of 620° F. for Teflon and in excess of about 450° F. for Kel-F. The baking is for approximately one-half hour. The time of baking, it will be understood, will vary depending upon the condition of the baking oven. An oven in which a large amount of air is recirculated will require a shorter baking time than one in which still air is present. Owing to the reduced concentration of solids in the dipping dispersion, the thickness of the coat will be less than that obtained with the spray coat dispersion which had a higher solids content. With a concentration of solids of two pounds per gallon, a coating in the vicinity of from 0.2 to 0.3 mil will be obtained. For a printable sleeve for identification purposes the plastic thickness need not be too great but only of sufficient thickness to give the sleeve the desired rigidity. It will be understood, of course, that for sleeves which are to be sawed into journal bushings the thickness of the plastic coating must be greater and of sufficient dimension to cover the irregularities produced by the weaving of the braiding. The dipping, air-drying, and baking steps are repeated until the build-up of the multiple layers of plastic upon the sleeve is sufficiently great for the desired purpose to which the sleeve is to be put. The sleeve is readily printable and is unaffected by solvents, gasoline, oils, and the like. The glass fiber sleeving, itself, is solid to a temperature above 1300° F. When impregnated with Teflon it will not soften under 500° F. With Kel-F, even after the plastic softens the printing will remain distinct. The plastic does not burn. It it should be exposed to excessive temperatures which will volatilize the plastic, the print will remain legible upon the glass fibers. With Kel-F, a sleeve exposed to a temperature of over 700° F. for over one-half hour retained its usefulness for identification purposes.

For journal bushings the surface of the sleeve is then polished with a very fine abrasive to give a smooth, waxy feeling surface. The sleeve is then sawed into a plurality of bushings having the correct length. These bushings may be readily placed over the shaft journals with which they are to be used and will form excellent bushings which need no lubrication. Owing to the reinforcement of the braided sleeve the cold flow which is experienced with a Teflon bushing per se is obviated. As pointed out above, Teflon is the superior material for use in journal bushings. It is to be remembered, however, that Kel-F can also be employed. Under identical conditions tests with steel sliding upon Teflon resulted in a coefficient of friction range from .09 to .21, while tests with Kel-F gave a coefficient of friction range from .17 to .25. For many applications this coefficient of friction presented by Kel-F will give satisfactory performance.

It will be seen that I have accomplished the objects of my invention. I have provided a method of manufacturing sleeving which can be employed advantageously for high temperature cable identification and for impregnating braiding of glass fibers or metal wire with Teflon in the manufacture of tubing capable of forming shaft journals which may be used in bearing assemblies without oil. I have provided a method of making sleeving uniformly impregnated inside and throughout with a dimensionally accurate layer of Teflon or Kel-F.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A method of making plastic impregnated sleeving including the steps of mounting a length of tubular braiding formed of fibers of noncombustible material upon a mandrel in contact therewith substantially throughout the interior surface of said braiding, spraying the tubular braiding thus mounted on the mandrel with a dispersion of a fluorocarbon polymer, heating the assembly to fuse the fluorocarbon polymer upon the surface of the tubular braid to form a coating of plastic, removing the plastic-coated braid from the mandrel, immersing the plastic-coated braid in a dispersion of a fluorocarbon polymer in a manner to permit dispersion to flow into the inside of the plastic-coated tube, removing the immersed tube from the dispersion and then heating the tube to a temperature above the fusion point of the fluorocarbon polymer.

2. A method, as in claim 1, in which the length of tubular braiding is cleaned prior to the mounting step.

3. A method, as in claim 1, in which said sprayed tubing is air-dried before the heating step.

4. A method, as in claim 1, in which said plastic-coated braid is immersed with its axis extending vertically.

5. A method, as in claim 1, in which said plastic-coated braid is mounted on a wire prior to the immersion step.

6. A method, as in claim 1, in which the immersing step and last-named heating steps are repeated to build up a thicker coating of plastic both interior and exterior of the tube.

7. A method of making plastic impregnated sleeving including the steps of mounting a length of tubular braiding formed of glass fibers upon a mandrel in contact therewith substantially throughout the interior surface of said braiding, spraying the tubular braiding thus mounted on the mandrel with polymerized tetra fluoroethylene, air-drying the assembly, heating the assembly to a temperature above 620° F. to fuse the polymerized tetra fluoroethylene and form a coating of plastic upon the tubular braiding, removing the polymerized tetra fluoroethylene-coated tube from the mandrel, mounting the plastic-coated tube upon a wire, immersing the wire-mounted polymerized tetra fluoroethylene-coated tube in a dispersion of polymerized tetra fluoroethylene, removing the immersed tube from the dispersion, air-drying the tube, and then heating the tube to a temperature above 620° F. to fuse the polymerized tetra fluoroethylene and form a coating both interior and exterior of the tube.

8. A method as in claim 7, in which said immersing, last-named air-drying, and last-named heating steps are repeated to build up a coating of polymerized tetra fluoroethylene.

9. A method as in claim 7, in which said polymerized tetra-fluoroethylene-coated tube is removed from the wire and divided into bushings adapted to be slipped over shafts to form journals.

References Cited in the file of this patent

UNITED STATES PATENTS

| | | |
|---|---|---|
| 2,034,352 | Pearce | Mar. 17, 1936 |
| 2,562,117 | Osdal | July 24, 1951 |
| 2,647,296 | Shive | Aug. 4, 1953 |
| 2,783,173 | Walker et al. | Feb. 26, 1957 |